United States Patent
Satou

(10) Patent No.: US 8,609,252 B2
(45) Date of Patent: Dec. 17, 2013

(54) RUBBER COMPOSITION

(75) Inventor: Yoshitaka Satou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 57 days.

(21) Appl. No.: 12/810,987

(22) PCT Filed: Dec. 26, 2008

(86) PCT No.: PCT/JP2008/073692
§ 371 (c)(1),
(2), (4) Date: Oct. 18, 2010

(87) PCT Pub. No.: WO2009/084617
PCT Pub. Date: Jul. 9, 2009

(65) Prior Publication Data
US 2011/0034638 A1    Feb. 10, 2011

(30) Foreign Application Priority Data

Dec. 27, 2007 (JP) ................. 2007-337817
Mar. 4, 2008 (JP) ................. 2008-053298
Jun. 11, 2008 (JP) ................. 2008-152832
Jun. 24, 2008 (JP) ................. 2008-164739

(51) Int. Cl.
C08L 9/00     (2006.01)
C08L 7/00     (2006.01)
C08C 19/20    (2006.01)
C08J 3/24     (2006.01)
C08K 5/44     (2006.01)

(52) U.S. Cl.
USPC .......... 428/462; 428/461; 428/465; 428/500; 428/521; 524/571; 524/572; 524/575.5; 524/576; 524/580; 525/331.9; 525/332.7; 525/333.1; 525/333.2; 525/349

(58) Field of Classification Search
USPC .......... 428/461, 462, 465, 500, 521; 524/571, 524/572, 575.5, 576, 580; 525/331.9, 525/332.7, 333.1, 333.2, 349
See application file for complete search history.

(56) References Cited

U.S. PATENT DOCUMENTS

| | | | | |
|---|---|---|---|---|
| 3,658,828 | A * | 4/1972 | D'Amico et al. | 548/168 |
| 4,609,499 | A * | 9/1986 | Esashi et al. | 556/7 |
| 4,752,507 | A | 6/1988 | Johansson et al. | |
| 5,939,493 | A * | 8/1999 | Hojo | 525/332.6 |
| 6,310,144 | B1 * | 10/2001 | Inui et al. | 525/332.5 |
| 7,115,181 | B2 | 10/2006 | Tanaka et al. | |
| 2005/0072513 | A1 | 4/2005 | Tanaka et al. | |
| 2008/0300368 | A1 * | 12/2008 | Miyazaki | 525/349 |

FOREIGN PATENT DOCUMENTS

| | | |
|---|---|---|
| CN | 1486839 A | 4/2004 |
| CN | 101314652 A | 12/2008 |
| EP | 0242432 A1 | 10/1987 |
| EP | 0 314 663 A1 | 5/1989 |
| EP | 0675161 A1 | 10/1995 |
| EP | 1260384 A2 * | 11/2002 |
| EP | 1352923 A1 | 10/2003 |
| EP | 1568735 A1 | 8/2005 |
| EP | 1674292 A1 | 6/2006 |
| EP | 1818186 A1 | 8/2007 |
| GB | 1177790 A | 1/1970 |
| JP | 48-11214 B | 4/1973 |
| JP | 10-251449 A | 9/1998 |
| JP | 2005-112918 A | 4/2005 |
| JP | 2005-139082 A | 6/2005 |
| JP | 2005-139239 A | 6/2005 |
| JP | 2006-249361 A | 9/2006 |
| JP | 2007-063245 A | 3/2007 |
| JP | 2007-112833 A | 5/2007 |
| JP | 2007-297593 A | 11/2007 |
| JP | 2009-007549 A | 1/2009 |
| WO | 2005/113666 A1 | 12/2005 |
| WO | 2006/091080 A1 | 8/2006 |

OTHER PUBLICATIONS

JP 2007-063245, machine translation, Mar. 2007.*
Extended European Search Report issued Dec. 23, 2011, in European Patent Application No. 08866719.1.
C.-D. Wacker et al., "New Sulfenamide Accelerators Derived from 'Safe' Amines for the Rubber and Tyre Industry", IARC Scientific publications, Lyon, vol. 105, Jan. 1, 1991, pp. 592-594 (XP001525568).

* cited by examiner

Primary Examiner — Roberto Rabago
(74) Attorney, Agent, or Firm — Sughrue Mion, PLLC

(57) ABSTRACT

A rubber composition comprises a rubber component, sulfur and a sulfeneamide base vulcanization accelerator represented by the following Formula (I), and has an excellent adhesive property with metal such as a steel cord without bringing about problems such as deteriorating in the physical properties and blooming of rubber after vulcanization.

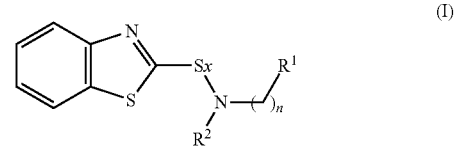

(I)

(wherein $R^1$ represents a branched alkyl group having 3 to 12 carbon atoms; $R^2$ represents a linear alkyl group having 1 to 10 carbon atoms or a branched alkyl group having 3 to 10 carbon atoms; x represents an integer of 1 or 2, and n represents an integer of 0 or 1).

14 Claims, No Drawings

RUBBER COMPOSITION

TECHNICAL FIELD

The present invention relates to a rubber composition containing a specific sulfeneamide base vulcanization accelerator, particularly to a rubber composition which is provided with excellent workability and remarkably reduced in generation of rubber burning without deteriorating physical properties of a vulcanized rubber and which is excellent in adhesion durability with metal reinforcing materials such as steel cords used for rubber products such as tires, industrial belts by using a specific sulfeneamide base vulcanization accelerator having a vulcanization retarding effect.

BACKGROUND ART

Composite materials prepared by coating metal reinforcing materials such as steel cords with rubber compositions for the purpose of reinforcing rubbers to enhance strength and durability thereof have so far been used for tires for cars, conveyor belts, hoses and the like, particularly rubber products to which strength is required.

The above rubber-metal composite materials require an adhesive property which is stable and less changed with the passage of time between rubber and a metal reinforcing material in order to exhibit a high reinforcing effect and obtain reliability.

Further, when rubber is adhered with metal, a method in which rubber and metal are bonded at the same time, that is, a direct vulcanization bonding method is known, and in this case, it is considered to be effective that a sulfeneamide base vulcanization accelerator which provides vulcanization reaction with a delayed action is used when vulcanization of rubber and bonding of rubber and metal are carried out at the same time.

At present, N,N-dicyclohexyl-2-benzothiazolylsulfeneamide (hereinafter abbreviated as "DCBS") represented by the following formula is known as a vulcanization accelerator which provides vulcanization reaction with the largest delayed action among commercially available sulfeneamide base vulcanization accelerators:

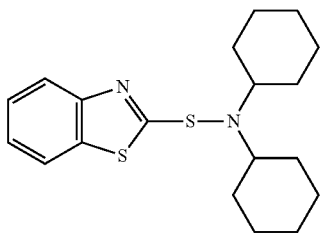

Further, when a larger delayed action than that in vulcanization reaction by DCBS is required, a vulcanization retardant other than a sulfeneamide base vulcanization accelerator is used in combination. N-(cyclohxylthio)phthalimide (hereinafter abbreviated as "CTP") is known as a representative vulcanization retardant which is commercially available, but it has already been known if this CTP is blended with rubber in a large amount, that it exerts an adverse effect on the physical properties of the vulcanized rubber and that it causes blooming which deteriorates the appearance of the vulcanized rubber and exerts an adverse effect on an adhesive property thereof.

Further, bissulfeneamide represented by a specific formula (refer to patent document 1) and benzothiazolylsulfeneamide base vulcanization accelerators (refer to patent document 2) obtained by using amine originating in natural fats and oils as a raw material are known as sulfeneamide base vulcanization accelerators other than DCBS described above.

However, with respect to the sulfeneamide base vulcanization accelerators described in patent documents 1 and 2, only rubber physical properties are disclosed, and the adhesion performances are neither described nor suggested therein. In addition thereto, it is neither described nor suggested at all that the sulfeneamide compound of the present invention can be used as a novel vulcanization accelerator for rubbers.

Further, several production processes for the sulfeneamide compounds used in the present invention are known, for example, in patent documents 3, 4 and 5, but it is neither described nor suggested at all that the above compounds can newly be used as a vulcanization accelerator for rubbers, and an adhesion performance with a steel cord which the above vulcanization accelerators provide is neither described nor suggested as well.

Patent document 1: Japanese Patent Application Laid-Open No. 2005-139082

Patent document 2: Japanese Patent Application Laid-Open No. 2005-139239

Patent document 3: EP0314663A1

Patent document 4: British Patent No. 1177790

Patent document 5: Japanese Patent Publication No. 1973-11214

DISCLOSURE OF THE INVENTION

Problems to be Solved by the Invention

In light of the conventional problems described above, the present inventors have tried to solve them, and an object of the present invention is to provide a rubber composition remarkably reduced in generation of rubber burning by using a vulcanization accelerator having a vulcanization retarding effect which is equal to or higher than that of DCBS without using a vulcanization retardant which is likely to bring about problems such as deterioration in the physical properties, blooming of the vulcanized rubber and the like and to provide a rubber composition which is excellent in an adhesive property with metal such as a steel cord.

Means for Solving the Problems

Intensive studies on the conventional problems described above repeated by the present inventors have resulted in finding that the targeted rubber composition described above can be obtained by using a specific sulfeneamide base vulcanization accelerator, and thus the present invention has come to be completed.

That is, the present invention comprises the following items (1) to (13).

(1) A rubber composition comprising a rubber component, sulfur and a sulfeneamide base vulcanization accelerator represented by the following Formula (I):

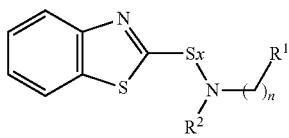

(wherein $R^1$ represents a branched alkyl group having 3 to 12 carbon atoms; $R^2$ represents a linear alkyl group having 1 to 10 carbon atoms or a branched alkyl group having 3 to 10 carbon atoms; x represents an integer of 1 or 2, and n represents an integer of 0 or 1).

(2) The rubber composition as described in the above item (1), comprising 0.1 to 10 parts by mass of the sulfeneamide base vulcanization accelerator represented by Formula (I) based on 100 parts by mass of the rubber component.

(3) The rubber composition as described in the above item (1), comprising 0.3 to 10 parts by mass of sulfur based on 100 parts by mass of the rubber component.

(4) The rubber composition as described in the above item (1), comprising 0.3 to 10 parts by mass of sulfur and 0.1 to 10 parts by mass of the sulfeneamide base vulcanization accelerator represented by Formula (I) based on 100 parts by mass of the rubber component.

(5) The rubber composition as described in the above item (1), wherein in Formula (I) $R^1$ is a tert-alkyl group, and n is 0.

(6) The rubber composition as described in the above item (1), wherein in Formula (I) $R^1$ is a tert-alkyl group, and $R^2$ is a linear alkyl group having 1 to 6 carbon atoms or a branched alkyl group having 3 to 6 carbon atoms.

(7) The rubber composition as described in the above item (1), wherein in Formula (I) $R^1$ is a tert-alkyl group; n is 0; and $R^2$ is a linear alkyl group having 1 to 6 carbon atoms or a branched alkyl group having 3 to 6 carbon atoms.

(8) The rubber composition as described in the above item (7), wherein in Formula (I) $R^1$ is a tert-alkyl group; n is 0; and $R^2$ is a methyl, ethyl or n-propyl group.

(9) The rubber composition as described in the above item (1), further comprising cobalt and/or a compound containing cobalt.

(10) The rubber composition as described in the above item (9), wherein a content of cobalt and/or the compound containing cobalt is 0.03 to 3 parts by mass in terms of a cobalt amount based on 100 parts by mass of the rubber component.

(11) The rubber composition as described in the above item (9) or (10), wherein the compound containing cobalt is a cobalt salt of organic acid.

(12) The rubber composition as described in any one of the above items (1) to (11), wherein the rubber component contains at least one of natural rubber and polyisoprene rubber.

(13) The rubber composition as described in any one of the above items (1) to (11), wherein the rubber component comprises 50% by mass or more of natural rubber and the balance of a synthetic rubber.

Effects of the Invention

The invention described in the above item (1) is a rubber composition containing a novel vulcanization accelerator suited for rubber and having a vulcanization retarding effect which is the same as or higher than that of N,N-dicyclohexyl-2-benzothiazolylsulfeneamide known as a vulcanization accelerator providing vulcanization reaction with the largest delayed action among sulfeneamide base vulcanization accelerators. The Mooney scorching time can be extended without deteriorating the vulcanizing property, and therefore obtained is a rubber composition which is excellent in workability and tensile characteristics and remarkably reduced in generation of rubber burning.

According to the invention described in the above items (2) to (8), the Mooney scorch time can be further extended in a suited range without deteriorating the vulcanizing property, and therefore obtained is a rubber composition which is further excellent in workability and tensile characteristics and remarkably reduced in generation of rubber burning.

According to the invention described in the above items (9) to (11), obtained is a rubber composition which is excellent in adhesion durability with metal reinforcing materials such as steel cords which are used for rubber products such as tires, industrial belts.

According to the invention described in the above item (12) or (13), a rubber composition which is excellent in durability is obtained.

BEST MODE FOR CARRYING OUT THE INVENTION

The embodiments of the present invention shall be explained below in details.

The rubber composition of the present invention is characterized by comprising a rubber component, sulfur and a sulfeneamide base vulcanization accelerator represented by the following Formula (I):

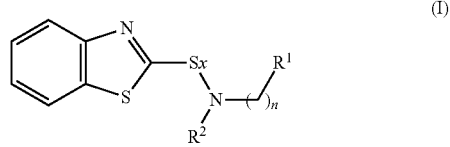

(wherein $R^1$ represents a branched alkyl group having 3 to 12 carbon atoms; $R^2$ represents a linear alkyl group having 1 to 10 carbon atoms or a branched alkyl group having 3 to 10 carbon atoms; x represents an integer of 1 or 2, and n represents an integer of 0 or 1).

The rubber component used in the present invention shall not specifically be restricted as long as it is rubber used for rubber products such as tires, industrial belts, and if it is a rubber component having a double bond in a principal chain, it can be cross-linked by sulfur. Accordingly, the sulfeneamide base vulcanization accelerator represented by Formula (I) described above functions for it, and for example, natural rubbers and/or diene base synthetic rubbers are used. Capable of being used is, to be specific, at least one of natural rubber, isoprene rubber, styrene-butadiene copolymers, butadiene rubber, ethylene-propylene-diene copolymers, chloroprene rubber, halogenated butyl rubber, acrylonitrile-butadiene rubber and the like.

At least one of natural rubber and isoprene rubber is preferably contained from the viewpoint of an adhesive property with metal reinforcing materials such as steel cords, and the rubber component comprises more preferably 50% by mass or more of natural rubber and the balance of at least one rubber selected from the synthetic rubbers described above from the viewpoint of durability of the belt rubber.

The sulfeneamide base vulcanization accelerator represented by Formula (I) described above according to the present invention has not yet so far been reported in the form of combination thereof with a cobalt base adhesive, and it has a vulcanization retarding effect equal to that of N,N-dicyclohexyl-2-benzothiazolylsulfeneamide and is excellent in adhesion durability in a direct vulcanization bonding with metal reinforcing materials such as steel cords so that it can suitably be used for a rubber composition for coating rubber products having a large thickness.

Further, among the sulfeneamide base vulcanization accelerators represented by Formula (I) described above, used as the vulcanization accelerator from the viewpoints of an adhesive property and a vulcanization retarding effect is the sulfeneamide compound in which $R^1$ is a tert-alkyl group; x is 1 or 2, and n is 0; $R^2$ is preferably the linear group, and among the linear groups, $R^2$ is more preferably methyl, ethyl or n-propyl. These sulfeneamide base vulcanization accelerators are used in the present invention for the first time as a vulcanization accelerator, and while they have a larger vulcanization retarding effect than that of N,N-dicyclohexyl-2-benzothiazolylsulfeneamide known as a vulcanization accelerator providing vulcanization reaction with the largest delayed action among conventional sulfeneamide base vulcanization accelerators, they have a sufficiently high vulcanization accelerating performance compatible with the above effect. In addition thereto, they are excellent in adhesion durability in a direct vulcanization bonding with metal reinforcing materials such as steel cords. Accordingly, they can suitably be used for rubber products having a large thickness and a rubber composition for coating.

In the present invention, $R^1$ in the sulfeneamide compound represented by Formula (I) described above represents a branched alkyl group having 3 to 12 carbon atoms. If this $R^1$ is a branched alkyl group having 3 to 12 carbon atoms, the compound represented by Formula (I) has a good vulcanization accelerating performance and can be enhanced in an adhesion performance.

The specific examples of $R^1$ in the compound represented by Formula (I) described above include isopropyl, isobutyl, sec-butyl, tert-butyl, isoamyl (isopentyl), neopentyl, tert-amyl (tert-pentyl), isohexyl, tert-hexyl, isoheptyl, tert-heptyl, isooctyl, tert-octyl, isononyl, tert-nonyl, isodecyl, tert-decyl, isoundecyl, tert-undecyl, isododecyl, tert-dodecyl and the like. Among them, the tert-alkyl groups having 4 to 12 carbon atoms are preferred from the viewpoint of such an effect that a suited scorch time is obtained, and particularly tert-butyl, tert-amyl (tert-pentyl) and tert-dodecyl, especially tert-butyl, are economically excellent from the viewpoints of the synthetic aspect and the availability of the raw materials and therefore preferred.

$R^2$ in the sulfeneamide compound represented by Formula (I) described above represents a linear alkyl group having 1 to 10 carbon atoms or a branched alkyl group having 3 to 10 carbon atoms. If this $R^2$ is a linear alkyl group having 1 to 10 carbon atoms or a branched alkyl group having 3 to 10 carbon atoms, the compound represented by Formula (I) has a good vulcanization accelerating performance and can be enhanced in an adhesion performance.

The specific examples of $R^2$ in the compound represented by Formula (I) described above include methyl, ethyl, n-propyl, isopropyl, n-butyl, isobutyl, sec-butyl, tert-butyl, n-amyl (n-pentyl), isoamyl (isopentyl), neopentyl, tert-amyl (tert-pentyl), n-hexyl, isohexyl, n-heptyl, isoheptyl, n-octyl, isooctyl, nonyl, isononyl, decyl and the like. Among them, a linear alkyl group having 1 to 8 carbon atoms or a branched alkyl group having 3 to 8 carbon atoms is preferred, and a linear alkyl group having 1 to 6 carbon atoms or a branched alkyl group having 3 to 6 carbon atoms is more preferred from the viewpoint of the effects such as easiness of the synthesis and the costs of the raw materials. Methyl, ethyl, n-propyl, isopropyl, n-butyl, isobutyl and sec-butyl are preferred. In particular, the linear alkyl groups having the above described number of carbon atoms are preferred rather to the branched alkyl groups having the above described number of carbon atoms from the viewpoint of obtaining the suitable Mooney scorch time and the high steel cord adhesion. This is because of the reasons that the branched alkyl groups further retard the vulcanization and therefore reduce the productivity and that when compared with the linear alkyl groups having the same number of carbon atoms, the branched alkyl groups deteriorate the adhesive property. Among them, methyl, ethyl and n-propyl are most preferred.

The suffix x in the sulfeneamide compound represented by Formula (I) described above represents an integer of 1 or 2, and n represents an integer of 0 or 1. From the viewpoint of the effects such as easiness of the synthesis and the costs of the raw materials, n is preferably 0.

As described above, preferred compounds among the sulfeneamide compounds represented by Formula (I) described above which are used in the present invention are listed below in order. To be specific, preferred from the viewpoints of not accelerating too much the Mooney scorch time, bringing about no rubber burning in processing and avoiding reduction in the workability and deterioration in the adhesive property are 1) the compounds in which in Formula (I) $R^1$ is a tert-alkyl group; n is 0; and $R^2$ is a linear alkyl group having 1 to 10 carbon atoms or a branched alkyl group having 3 to 10 carbon atoms, 2) the compounds in which in Formula (I) $R^1$ is a tert-alkyl group; n is an integer of 0 or 1; and $R^2$ is a linear alkyl group having 1 to 6 carbon atoms or a branched alkyl group having 3 to 6 carbon atoms, 3) the compounds in which in Formula (I) $R^1$ is a tert-alkyl group; n is 0; and $R^2$ is a linear alkyl group having 1 to 6 carbon atoms or a branched alkyl group having 3 to 6 carbon atoms and 4) the compounds in which in Formula (I) $R^1$ is a tert-alkyl group; n is 0; and $R^2$ is methyl, ethyl or n-propyl (the compounds of the later order are more preferred sulfeneamide compounds).

In a case where $R^1$ in the sulfeneamide compound represented by Formula (I) described above is a functional group (for example, n-octadecyl and the like) other than a branched alkyl group having 3 to 12 carbon atoms or a branched alkyl group having more than 12 carbon atoms and a case where $R^2$ is a functional group (for example, n-octadecyl and the like) other than a linear alkyl group 1 to 10 carbon atoms or branched alkyl group having 3 to 10 carbon atoms or a linear or branched alkyl group having more than 10 carbon atoms and in a case where n is 2 or more, the aimed effects of the present invention are less exhibited, and sometimes the productivity is reduced or the adhesive property is deteriorated due to retardation of the scorch time and extension of the vulcanization time, or the vulcanization performance as the accelerator and the rubber performances are deteriorated. Further, x of 3 or more is not preferred in terms of the stability.

In the present invention, the representative examples of the compound represented by Formula (I) include N-methyl-N-t-butylbenzothiazole-2-sulfeneamide (BMBS), N-ethyl-N-t-butylbenzothiazole-2-sulfeneamide (BEBS), N-n-propyl-N-t-butylbenzothiazole-2-sulfeneamide, N-isopropyl-N-t-butylbenzothiazole-2-sulfeneamide, N-n-butyl-N-t-butylbenzothiazole-2-sulfeneamide (BBBS), N-isobutyl-N-t-butylbenzothiazole-2-sulfeneamide, N-sec-butyl-N-t-butylbenzothiazole-2-sulfeneamide, N-methyl-N-isoamylbenzothiazole-2-sulfeneamide, N-ethyl-N-isoamylbenzothiazole-2-sulfeneamide, N-n-propyl-N-isoamylbenzothiazole-2-sulfeneamide, N-isopropyl-N- isoamylbenzothiazole-2-sulfeneamide, N-n-butyl-N-isoamylbenzothiazole-2-sulfeneamide, N-isobutyl-N-isoamylbenzothiazole-2-sulfeneamide, N-sec-butyl-N-isoamylbenzothiazole-2-sulfeneamide, N-methyl-N-tert-amylbenzothiazole-2-sulfeneamide, N-ethyl-N-tert-amylbenzothiazole-2-sulfeneamide, N-n-propyl-N-tert-amylbenzothiazole-2-sulfeneamide, N-isopropyl-N-tert-amylbenzothiazole-2-sulfeneamide, N-n-butyl-N-tert-amylbenzothiazole-2-sulfeneamide, N-isobutyl-N-tert-amylbenzothiazole-2-sulfeneamide, N-sec-butyl-N-tert-amylbenzothiazole-2-sulfeneamide, N-methyl-N-tert-heptylbenzothiazole-2-sulfeneamide, N-ethyl-N-tert-heptylbenzothiazole-2-sulfeneamide, N-n-propyl-N-tert-heptylbenzothiazole-2-sulfeneamide, N-isopropyl-N-tert-heptylbenzothiazole-2-sulfeneamide, N-n-butyl-N-tert-heptylbenzothiazole-2-sulfeneamide, N-isobutyl-N-tert-heptylbenzothiazole-2-sulfeneamide, N-sec-butyl-N-tert-heptylbenzothiazole-2-sulfeneamide and the like. The above compounds can be used alone or in a mixture of two or more kinds thereof (hereinafter referred to merely as "at least one").

From the viewpoint of providing a better adhesion performance, preferred are N-methyl-N-t-butylbenzothiazole-2-sulfeneamide (BMBS), N-ethyl-N-t-butylbenzothiazole-2-sulfeneamide (BEBS), N-n-propyl-N-t-butylbenzothiazole-2-sulfeneamide, N-isopropyl-N-t-butylbenzothiazole-2-sulfeneamide, N-isobutyl-N-t-butylbenzothiazole-2-sulfeneamide and N-sec-butyl-N-t-butylbenzothiazole-2-sulfeneamide.

Among them, particularly N-methyl-N-t-butylbenzothiazole-2-sulfeneamide (BMBS), N-ethyl-N-t-butylbenzothiazole-2-sulfeneamide (BEBS) and N-n-propyl-N-t-butylbenzothiazole-2-sulfeneamide are preferably used from the viewpoint of providing the longest scorch time and the excellent adhesion performance.

The above compounds may be used alone or in combination thereof. Further, they can be used in combination with general purpose-vulcanization accelerators such as N-tert-butyl-2-benzothiazolesulfeneamide (TBBS), N-cyclohexyl-2-benzothiazolesulfeneamide (CBS), dibenzothiazolyl disulfide (MBTS).

The following process can be given as the preferred production process for the sulfeneamide compound represented by Formula (I) according to the present invention.

That is, N-chloroamine prepared in advance by reacting a corresponding amine with sodium hypochlorite is reacted with bis(benzothiazole-2-yl) disulfide in a suitable solvent under the presence of an amine and a base. When an amine is used as the base, the reaction solution is neutralized to isolate the free amine, and then suitable after-treatments such as filtering, water-washing, condensation and recrystallization are carried out according to the properties of the resulting reaction mixture, whereby targeted sulfeneamide is obtained.

The base used in the present production process includes the amine of the raw material used in an excess amount, tertiary amines such as triethylamine, alkali hydroxide, alkali carbonate, alkali bicarbonate, sodium alkoxide and the like. In particular, preferred is a process in which an excess of the raw material amine or triethylamine of tertiary amine is used as the base to carry out the reaction and then resulting hydrochloride salt is neutralized by sodium hydroxide to obtain the targeted compound, followed by recovering the amine from the filtrate and reusing.

The solvent used in the present production process is preferably alcohol, particularly preferably methanol.

In the production process of, for example, N-ethyl-N-tbutylbenzothiazole-2-sulfeneamide (BEBS), a sodium hypochlorite aqueous solution is dropwise added to N-t-butylethylamine at 0° C. or lower and stirred for 2 hours, and then 25 the oil layer is separated. Bis(benzothiazole-2-yl) disulfide, N-t-butylethylamine and the above oil layer are suspended in methanol and stirred under refluxing for 2 hours. After cooling, the solution is neutralized by sodium hydroxide, filtered, washed with water and concentrated under reduced pressure, and then the concentrate is recrystallized, whereby 5 targeted BEBS (white solid) can be obtained.

A content of the above sulfeneamide base vulcanization accelerators is 0.1 to 10 parts by mass, preferably 0.5 to 5.0 parts by mass and more preferably 0.8 to 2.5 parts by mass based on 100 parts by mass of the rubber component.

If a content of the above vulcanization accelerator is less than 0.1 part by mass, the vulcanization does not sufficiently proceed. On the other hand, if it exceeds 10 parts by mass, the problem of blooming is brought about, and therefore both ranges are not preferred.

Sulfur used in the present invention is a vulcanizing agent, and a content thereof is 0.3 to 10 parts by mass, preferably 1.0 to 7.0 parts by mass and more preferably 3.0 to 7.0 parts by mass based on 100 parts by mass of the rubber component.

If a content of the above sulfur is less than 0.3 part by mass, the vulcanization does not sufficiently proceed. On the other hand, if it exceeds 10 parts by mass, an anti-aging performance of the rubber is deteriorated, and therefore it is not preferred.

Further, cobalt (elemental substance) and/or a compound containing cobalt are added preferably to the rubber composition of the present invention from the viewpoint of enhancing the initial adhesion performance.

The compound containing cobalt which can be used includes at least one of cobalt salts of organic acids and cobalt salts of inorganic acids such as cobalt chloride, cobalt sulfate, cobalt nitrate, cobalt phosphate and cobalt chromate.

The cobalt salts of organic acids are preferably used from the viewpoint of further enhancing the initial adhesion performance.

Capable of being given as the cobalt salts of organic acids which can be used is at least one of, for example, cobalt naphthenate, cobalt stearate, cobalt neodecanoate, cobalt rhodinate, cobalt versatate, a cobalt salt of tall oil acid and the like. Also, a cobalt salt of organic acid may be a composite salt obtained by substituting a part of the organic acid with boric acid, and to be specific, a commercially available product of a trade name "Manobond" manufactured by OMG Co., Ltd. can be used as well.

A (total) content of the above cobalt and/or the compound containing cobalt is 0.03 to 3 parts by mass, preferably 0.03 to 1 part by mass and more preferably 0.05 to 0.7 part by mass in terms of a cobalt amount based on 100 parts by mass of the rubber component.

If a content of cobalt is less than 0.03 part by mass, further adhesive property can not be exhibited. On the other hand, if it exceeds 3 parts by mass, the physical properties against aging are deteriorated to a large extent, and therefore it is not preferred.

In addition to the rubber component, sulfur, the vulcanization accelerator and the cobalt compound each described above, compounding ingredients usually used for rubber products such as tires, conveyor belts can be used for the rubber composition of the present invention as long as the effects of the present invention are not damaged. For example, an inorganic filler such as carbon black, silica, a softener, an age resister and the like can suitably be blended according to the uses.

The rubber composition of the present invention can be produced by kneading the respective components described above by means of, for example, a Banbury mixer, a kneader and the like, and it can suitably be used for treads of tires for passenger cars, trucks, buses, two-wheel vehicles and the like, rubber products having a large thickness such as hoses, belt conveyors and rubber products in which rubbers are subjected to direct vulcanization bonding with metals.

The rubber composition of the present invention can suitably be applied to rubber products to which strength is particularly required such as tires for automobiles, conveyor belts, hoses, to be specific, to rubber-metal composite materials obtained by covering metal-reinforced materials such as steel cords with the rubber compositions for the purpose of reinforcing rubbers to enhance strength and durability.

The rubber composition of the present invention thus constituted contains a specific sulfeneamide base novel vulcanization accelerator having a vulcanization retarding effect which is the same as or more that of N,N-dicyclohexyl-2-benzothiazolylsulfeneamide known as a vulcanization accelerator providing vulcanization reaction with the largest delayed action among sulfeneamide base vulcanization accelerators, and therefore a rubber composition which is provided with excellent workability and remarkably reduced in generation of rubber burning without deteriorating physical properties of a vulcanized rubber is obtained without using a vulcanization retardant which is likely to bring about problems such as deterioration in the physical properties of vulcanized rubber, blooming thereof and the like. Further, in the case of the rubber composition further comprising cobalt (elemental substance) and/or a compound containing cobalt, obtained is a rubber composition which is excellent in adhesion durability with metal reinforcing materials such as steel cords used for rubber products such as tires and industrial belts.

EXAMPLES

Next, the present invention shall be explained in further details with reference to production examples of the vulcanization accelerators of the present invention, examples of the rubber compositions of the present invention and comparative examples, but the present invention shall by no means be restricted by the production examples and the examples described below.

Production Example 1

Synthesis of N-ethyl-N-t-butylbenzothiazole-2-sulfeneamide (BEBS)

A 12% sodium hypochlorite aqueous solution 148 g was dropwise added to N-t-butylethylamine 16.4 g (0.162 mol) at 0° C. or lower and stirred for 2 hours, and the oil layer was separated. Bis(benzothiazole-2-yl)disulfide 39.8 g (0.120 mol), N-t-butylethylamine 24.3 g (0.240 mol) and the above oil layer were suspended in 120 ml of methanol and stirred under refluxing for 2 hours. After cooling, the solution was neutralized by sodium hydroxide 6.6 g (0.166 mol), filtered, washed with water and concentrated under reduced pressure, and then the concentrate was recrystallized, whereby 41.9 g (yield: 66%) of targeted BEBS was obtained in the form of white solid (melting point: 60 to 61° C.).

The spectral data of BEBS thus obtained is shown below.
$^1$H-NMR (400 MHz, CDCl$_3$) δ=1.29 (t, 3H, J=7.1 Hz, CH$_3$ (ethyl)), 1.34 (s, 9H, CH$_3$ (t-butyl)), 2.9 to 3.4 (br-d, CH$_2$), 7.23 (1H, m), 7.37 (1H, m), 7.75 (1H, m), 7.78 (1H, m).
$^{13}$C-NMR (100 MHz, CDCl$_3$) δ=15.12, 28.06, 47.08, 60.41, 120.70, 121.26, 123.23, 125.64, 134.75, 154.93, 182.63.
mass spectrometry (EI, 70 eV): m/z; 251 (M$^+$-CH$_4$), 167 (M$^+$-C$_6$H$_{14}$N), 100 (M$^+$-C$_7$H$_5$NS$_2$).
IR (KBr, cm$^{-1}$): 3061, 2975, 2932, 2868, 1461, 1429, 1393, 1366, 1352, 1309, 1273, 1238, 1198, 1103, 1022, 1011, 936, 895, 756, 727.

Production Example 2

Synthesis of N-methyl-N-t-butylbenzothiazole-2-sulfeneamide

The same procedure as in Production Example 1 was carried out, except that N-t-butylmethylamine 14.1 g (0.162 mol) and 20.9 g (0.240 mol) were used in place of N-t-butylethylamine, whereby 46.8 g (yield: 82%) of BMBS was obtained in the form of white solid (melting point: 56 to 58° C.).
$^1$H-NMR (400 MHz, CDCl$_3$) δ=1.32 (9H, s, CH$_3$ (t-butyl)), 3.02 (3H, s, CH$_3$ (methyl)), 7.24 (1H, m), 7.38 (1H, m), 7.77 (1H, m), 7.79 (1H, m).
$^{13}$C-NMR (100 MHz, CDCl$_3$) δ=27.3, 41.9, 59.2, 120.9, 121.4, 123.3, 125.7, 135.0, 155.5, 180.8.
mass spectrometry (EI, 70 eV): m/z; 252 (M$^+$), 237 (M$^+$-CH$_3$), 223 (M$^+$-C$_2$H$_6$), 195 (M$^+$-C$_4$H$_9$), 167 (M$^+$-C$_5$H$_{12}$N), 86 (M$^+$-C$_7$H$_4$NS$_2$).

Production Example 3

Synthesis of N-n-propyl-N-t-butylbenzothiazole-2-sulfeneamide

The same procedure as in Production Example 1 was carried out, except that N-n-propyl-t-butylamine 18.7 g (0.162 mol) and 27.7 g (0.240 mol) were used in place of N-t-butylethylamine, whereby N-n-propyl-N-t-butylbenzothiazole-2-sulfeneamide was obtained in the form of white solid (melting point: 50 to 52° C.).
$^1$H-NMR (400 MHz, CDCl$_3$) δ: 0.92 (t, J=7.3 Hz, 3H), 1.34 (s, 9H), 1.75 (br, 2H), 3.03 (brd, 2H), 7.24 (t, J=7.0 Hz, 1H), 7.38 (t, J=7.0 Hz, 1H), 7.77 (d, J=7.5 Hz, 1H), 7.79 (d, J=7.5 Hz, 1H).
$^{13}$C-NMR (100 MHz, CDCl$_3$) δ: 11.7, 23.0, 28.1, 55.3, 60.4, 120.7, 121.3, 123.3, 125.7, 134.7, 154.8, 181.3.

Production Example 4

Synthesis of N-1-propyl-N-t-butylbenzothiazole-2-sulfeneamide

The same procedure as in Production Example 1 was carried out, except that N-1-propyl-t-butylamine 18.7 g (0.162 mol) and 27.7 g (0.240 mol) were used in place of N-t-butylethylamine, whereby N-1-propyl-N-t-butylbenzothiazole-2-sulfeneamide was obtained in the form of white solid (melting point: 68 to 70° C.).
$^1$H-NMR (400 MHz, CDCl$_3$) δ: 1.20 to 1.25 (dd, (1.22 ppm: J=6.4 Hz, 1.23 ppm: J=6.4 Hz) 6H), 1.37 (s, 9H), 3.78 (m, J=6.3 Hz, 1H), 7.23 (t, J=7.0 Hz, 1H), 7.38 (t, J=7.0 Hz, 1H), 7.77 (d, J=7.5 Hz, 1H), 7.79 (d, J=7.5 Hz, 1H).

$^{13}$C-NMR (100 MHz, CDCl$_3$) δ: 22.3, 23.9, 29.1, 50.6, 61.4, 120.6, 121.2, 123.2, 125.6, 134.5, 154.5, 183.3.

Production Example 5

Synthesis of
N,N-di-1-propylbenzothiazole-2-sulfeneamide

The same procedure as in Production Example 1 was carried out, except that N-di-1-propylamine 16.4 g (0.162 mol) and 24.3 g (0.240 mol) were used in place of N-t-butylethylamine, whereby N,N-di-i-propylbenzothiazole-2-sulfeneamide was obtained in the form of white solid (melting point: 57 to 59° C.).
$^1$H-NMR (400 MHz, CDCl$_3$) d 1.26 (d, J=6.5 Hz, 12H), 3.49 (dq, J=6.5 Hz, 2H), 7.24 (t, J=7.0 Hz, 1H), 7.37 (t, J=7.0 Hz, 1H), 7.75 (d, J=8.6 Hz, 1H), 7.79 (d, J=8.6 Hz, 1H).
$^{13}$C-NMR (100 MHz, CDCl$_3$) d 21.7, 22.5, 55.7, 120.8, 121.3, 123.4, 125.7, 134.7, 155.1, 182.2.
Mass spectrometry (EI, 70 eV): m/z; 266 (M$^+$), 251 (M$^+$-15), 218 (M$^+$-48), 209 (M$^+$-57), 182 (M$^+$-84), 167 (M$^+$-99), 148 (M$^+$-118), 100 (M$^+$-166: base).

Production Example 6

Synthesis of
N-n-butyl-N-t-butylbenzothiazole-2-sulfeneamide

The same procedure as in Production Example 1 was carried out, except that N-t-butyl-n-butylamine 20.9 g (0.162 mol) and 31.0 g (0.240 mol) were used in place of N-t-butylethylamine, whereby 42.4 g (yield: 60%) of BBBS was obtained in the form of white solid (melting point: 55 to 56° C.).
$^1$H-NMR (400 MHz, CDCl$_3$) δ=0.89 (3H, t, J=7.32 Hz, CH$_3$ (n-Bu)), 1.2 to 1.4 (s+m, 11H, CH$_3$ (t-butyl)+CH$_2$ (n-butyl)), 1.70 (br. s, 2H, CH$_2$), 2.9 to 3.2 (br. d, 2H, N—CH$_2$), 7.23 (1H, m), 7.37 (1H, m), 7.75 (1H, m), 7.78 (1H, m).
$^{13}$C-NMR (100 MHz, CDCl$_3$) δ: 14.0, 20.4, 27.9, 31.8, 53.0, 60.3, 120.6, 121.1, 123.1, 125.5, 134.6, 154.8, 181.2.
mass spectrometry (EI, 70 eV): m/z; 294 (M$^+$), 279 (M$^+$-CH$_3$), 237 (M$^+$-C$_4$H$_9$), 167 (M$^+$-C$_8$H$_{18}$N), 128 (M$^+$-C$_7$H$_4$NS$_2$).
IR (neat): 1707 cm$^{-1}$, 3302 cm$^{-1}$.

Examples 1 to 19 and Comparative Examples 1 to 9

The rubber component, sulfur, the vulcanization accelerators obtained in the production examples, a cobalt salt of organic acid and other compounding ingredients were mixed and kneaded in blending formulation shown in the following Table 1 and Table 2 by means of a Banbury mixer of 2200 ml to prepare unvulcanized rubber compositions, and the Mooney viscosity, the Mooney scorch time, the elongation (Eb) and the stress (Tb) at break, the tensile stress (M300) at 300% extension and the adhesion performance were evaluated by the following methods. The results thereof are shown in the following Table 1 and Table 2.
Evaluation Methods of Mooney Viscosity and Mooney Scorch Time:
  Evaluated according to JIS K 6300-1: 2001.
  In the evaluations, the values were shown by indices, wherein the values obtained in Comparative Example 1 were set to 100. In the case of the Mooney viscosity, the smaller value shows that the workability is better, and in the case of the Mooney scorch time, the larger value shows that the workability is better.
Evaluation Method of Tensile Characteristics:
  Vulcanized rubbers obtained by vulcanizing the rubber compositions described above at 145° C. for 60 minutes were subjected to measuring tests at 25° C. according to JIS K 6301-1995 (No. 3 form test piece) to measure an elongation (Eb) and a stress (Tb) at break and a tensile stress (M300) at 300% extension, and the values were shown by indices, wherein tensile characteristics of the rubber composition obtained in Comparative Example 1 were set to 100. The larger values show that the tensile characteristics are better.
Evaluation Method of Adhesion Performance:
  Three steel cords (outer diameter 0.5 mm X length 300 mm) plated with brass (Cu: 63 wt %, Zn: 37 wt %) were arranged parallel at an interval of 10 mm, and these steel cords were coated with the respective rubber compositions from both the upper and lower sides and vulcanized under the conditions of 160° C. and 20 minutes to prepare samples.
  The adhesive properties of the respective samples thus obtained were evaluated according to ASTM-D-2229, wherein the steel cords were draw out from the respective samples to visually observe the covering states of the rubbers, and they were shown by 0 to 100% as an index for the adhesive property. In the case of the heat resistant adhesive property, after the respective samples were left standing in a gear oven of 100° C. for 15 and 30 days, the steel cords were draw out from them according to the test method described above to visually observe the covering states of the rubbers, and they were shown by 0 to 100% as an index for the heat resistant adhesive property. The larger value shows that the heat resistant adhesive property is better.

TABLE 1

(Blending unit: part by mass)

| | Example | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Natural rubber | 100 | 100 | 100 | 100 | 90 | 90 | 100 | 100 | 100 | 100 | 100 | 100 | 100 | 90 | 90 |
| Butadiene rubber *1 | | | | | 10 | | | | | | | | | 10 | |
| Styrene-butadiene rubber *2 | | | | | | 10 | | | | | | | | | 10 |
| HAF carbon black | 60 | 60 | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 | 8 | 8 |
| Age resister *3 | 2 | 2 | 2 | 2 | 2 | 2 | 2 | 2 | 2 | 2 | 2 | 2 | 2 | 2 | 2 |
| Vulcanization accelerator DCBS *4 | — | — | — | — | — | — | — | — | — | — | 1 | — | — | — | — |
| Vulcanization accelerator CBS *5 | — | — | 0.2 | — | — | — | — | — | — | — | — | 1 | — | — | — |
| Vulcanization accelerator NS *6 | — | — | — | 0.2 | — | — | — | — | — | — | — | — | 1 | — | — |
| Sulfur | 5 | 5 | 5 | 5 | 5 | 5 | 5 | 5 | 5 | 5 | 5 | 5 | 5 | 5 | 5 |

TABLE 1-continued (Blending unit: part by mass)

|  | Example | | | | | | | | | | Comparative Example | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 |
| Novel vulcanization accelerator 1 *7 | 1 | — | — | — | — | — | — | — | — | — | — | — | — | — | — |
| Novel vulcanization accelerator 2 *8 | — | 1 | 0.8 | 0.8 | 1 | 1 | — | — | — | — | — | — | — | — | — |
| Novel vulcanization accelerator 3 *9 | — | — | — | — | — | — | 1 | — | — | — | — | — | — | — | — |
| Novel vulcanization accelerator 4 *10 | — | — | — | — | — | — | — | 1 | — | — | — | — | — | — | — |
| Novel vulcanization accelerator 5 *11 | — | — | — | — | — | — | — | — | 1 | — | — | — | — | — | — |
| Novel vulcanization accelerator 6 *12 | — | — | — | — | — | — | — | — | — | 1 | — | — | — | — | — |
| Mooney viscosity ($ML_{1+4}$) | 95 | 95 | 94 | 94 | 92 | 93 | 95 | 95 | 95 | 95 | 100 | 100 | 100 | 97 | 101 |
| Mooney scorch time ($t_3$) | 105 | 110 | 99 | 107 | 114 | 115 | 110 | 115 | 112 | 111 | 100 | 70 | 90 | 107 | 109 |
| Evaluation of tensile characteristics Eb | 99 | 98 | 101 | 97 | 91 | 88 | 97 | 101 | 104 | 96 | 100 | 103 | 98 | 88 | 85 |
| Tb | 105 | 103 | 100 | 100 | 96 | 93 | 98 | 100 | 103 | 100 | 100 | 101 | 97 | 92 | 91 |
| M300 | 105 | 105 | 100 | 99 | 100 | 99 | 101 | 99 | 99 | 103 | 100 | 98 | 99 | 101 | 99 |

*1: BR01

*2: SBR #1778

*3: N-phenyl-N'-1,3-dimethylbutyl-p-phenylenediamine (trade name: Nocceler 6C, manufactured by Ouchi Shinko Chemical Industrial Co., Ltd.)

*4: N,N'-dicyclohexyl-2-benzothiazylsulfeneamide (trade name: Nocceler DZ, manufactured by Ouchi Shinko Chemical Industrial Co., Ltd.)

*5: N-cyclohexyl-2-benzothiazylsulfeneamide (trade name: Nocceler CZ, manufactured by Ouchi Shinko Chemical Industrial Co., Ltd.)

*6: N-t-butylbenzothiazole-2-sulfeneamide (trade name: Nocceler NS, manufactured by Ouchi Shinko Chemical Industrial Co., Ltd.)

*7: N-methyl-N-t-butylbenzothiazole-2-sulfeneamide

*8: N-ethyl-N-t-butylbenzothiazole-2-sulfeneamide

*9: N-n-propyl-N-t-butylbenzothiazole-2-sulfeneamide

*10: N-i-propyl-N-t-butylbenzothiazole-2-sulfeneamide

*11: N,N-di-i-propylbenzothiazole-2-sulfeneamide

*12: N-n-butyl-N-t-butylbenzothiazole-2-sulfeneamide

TABLE 2

(Blending unit: part by mass)

|  | Example | | | | | | | | | Comparative Example | | | |
| --- | --- | --- | --- | --- | --- | --- | --- | --- | --- | --- | --- | --- | --- |
|  | 11 | 12 | 13 | 14 | 15 | 16 | 17 | 18 | 19 | 6 | 7 | 8 | 9 |
| Natural rubber | 100 | 100 | 100 | 90 | 90 | 100 | 100 | 100 | 100 | 100 | 100 | 90 | 90 |
| Butadiene rubber *1 |  |  |  | 10 |  |  |  |  |  |  |  | 10 |  |
| Styrene-butadiene rubber *2 |  |  |  |  | 10 |  |  |  |  |  |  |  | 10 |
| HAF carbon black | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 |
| Age resister *3 | 2 | 2 | 2 | 2 | 2 | 2 | 2 | 2 | 2 | 2 | 2 | 2 | 2 |
| Vulcanization accelerator DCBS *4 | — | — | — | — | — | — | — | — | — | 1 | — | — | 1 |
| Vulcanization accelerator CBS *5 | — | — | 0.2 | — | — | — | — | — | — | — | 1 | 1 | 1 |
| Sulfur | 5 | 5 | 5 | 5 | 5 | 5 | 5 | 5 | 5 | 5 | 5 | 5 | 5 |
| Cobalt salt of fatty acid *6 | 1 | 1 | 1 | 1 | 1 | 1 | 1 | 1 | 1 | 1 | 1 | 1 | 1 |
| Novel vulcanization accelerator 1 *7 | 1 | — | — | — | — | — | — | — | — | — | — | — | — |
| Novel vulcanization accelerator 2 *8 | — | 1 | 0.8 | 1 | 1 | — | — | — | — | — | — | — | — |
| Novel vulcanization accelerator 3 *9 | — | — | — | — | — | 1 | — | — | — | — | — | — | — |
| Novel vulcanization accelerator 4 *10 | — | — | — | — | — | — | 1 | — | — | — | — | — | — |
| Novel vulcanization accelerator 5 *11 | — | — | — | — | — | — | — | 1 | — | — | — | — | — |
| Novel vulcanization accelerator 6 *12 | — | — | — | — | — | — | — | — | 1 | — | — | — | — |
| Mooney viscosity ($ML_{1+4}$) | 95 | 95 | 94 | 92 | 93 | 95 | 95 | 95 | 95 | 100 | 100 | 97 | 101 |
| Mooney scorch time ($t_3$) | 105 | 110 | 99 | 114 | 115 | 110 | 115 | 112 | 111 | 100 | 70 | 107 | 109 |
| Evaluation of tensile characteristics Eb | 98 | 99 | 101 | 91 | 89 | 96 | 100 | 102 | 98 | 100 | 104 | 88 | 85 |
| Tb | 104 | 105 | 100 | 96 | 92 | 100 | 102 | 103 | 101 | 100 | 100 | 91 | 91 |
| M300 | 102 | 104 | 100 | 100 | 99 | 101 | 98 | 100 | 102 | 100 | 99 | 100 | 99 |

TABLE 2-continued

| | | Example | | | | | | | | | Comparative Example (Blending unit: part by mass) | | | |
|---|---|---|---|---|---|---|---|---|---|---|---|---|---|---|
| | | 11 | 12 | 13 | 14 | 15 | 16 | 17 | 18 | 19 | 6 | 7 | 8 | 9 |
| Heat resistant adhesive property | Degradation for 15 days | 90 | 90 | 75 | 85 | 80 | 85 | 75 | 75 | 75 | 70 | 60 | 65 | 60 |
| | Degradation for 30 days | 60 | 60 | 45 | 60 | 55 | 55 | 45 | 40 | 40 | 40 | 20 | 40 | 35 |

*1: BR01
*2: SBR #1778
*3: N-phenyl-N'-1,3-dimethylbutyl-p-phenylenediamine (trade name: Nocceler 6C, manufactured by Ouchi Shinko Chemical Industrial Co., Ltd.)
*4: N,N'-dicyclohexyl-2-benzothiazylsulfeneamide (trade name: Nocceler DZ, manufactured by Ouchi Shinko Chemical Industrial Co., Ltd.)
*5: N-cyclohexyl-2-benzothiazylsulfeneamide (trade name: Nocceler CZ, manufactured by Ouchi Shinko Chemical Industrial Co., Ltd.)
*6: trade name Manobond C22.5 (cobalt content: 22.5% by mass) manufactured by OMG Co., Ltd.
*7: N-methyl-N-t-butylbenzothiazole-2-sulfeneamide
*8: N-ethyl-N-t-butylbenzothiazole-2-sulfeneamide
*9: N-n-propyl-N-t-butylbenzothiazole-2-sulfeneamide
*10: N-i-propyl-N-t-butylbenzothiazole-2-sulfeneamide
*11: N,N-di-i-propylbenzothiazole-2-sulfeneamide
*12: N-n-butyl-N-t-butylbenzothiazole-2-sulfeneamide As apparent from the results shown in Table 1, it has been found that in Examples 1 to 10 which fall in the scope of the present invention, the Mooney scorch time can be extended without deteriorating the physical properties of the vulcanized rubber (Eb, Tb and M300) as compared with in Comparative Examples 1 to 5 which fall outside the scope of the present invention, so that they are excellent in workability.

The blending formulations of the respective rubber compositions in which a compound containing cobalt is further added are shown in Table 2, and as apparent from the results shown in Table 2, it has been found that in Examples 11 to 19 which fall in the scope of the present invention, the Mooney scorch time can be extended without deteriorating the physical properties of the vulcanized rubber (Eb, Tb and M300) as compared with in Comparative Examples 6 to 9 which fall outside the scope of the present invention, so that they are excellent in workability and tensile characteristics and exhibit excellent heat resistant adhesive property.

INDUSTRIAL APPLICABILITY

The rubber composition of the present invention can suitably be applied to treads of tires for passenger cars, trucks, buses, two-wheel vehicles and the like, rubber products having a large thickness such as hoses, belt conveyors and rubber products in which rubbers are subjected to direct vulcanization bonding with metals.

What is claimed is

1. A rubber-metal composite material comprising a metal reinforcing material covered by a rubber composition, wherein the rubber composition comprises a rubber component, sulfur and a sulfeneamide base vulcanization accelerator represented by the following Formula (I):

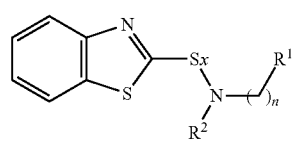

(I)

(wherein $R^1$ represents a branched alkyl group having 3 to 12 carbon atoms; $R^2$ represents a linear alkyl group having 1 to 10 carbon atoms; x represents an integer of 1 or 2, and n represents an integer of 0 or 1).

2. The rubber-metal composite material as described in claim 1, wherein the rubber composition comprises 0.1 to 10 parts by mass of the sulfeneamide base vulcanization accelerator represented by Formula (I) based on 100 parts by mass of the rubber component.

3. The rubber-metal composite material as described in claim 1, wherein the rubber composition comprises 0.3 to 10 parts by mass of sulfur based on 100 parts by mass of the rubber component.

4. The rubber-metal composite material as described in claim 1, wherein the rubber composition comprises 0.3 to 10 parts by mass of sulfur and 0.1 to 10 parts by mass of the sulfeneamide base vulcanization accelerator represented by Formula (I) based on 100 parts by mass of the rubber component.

5. The rubber-metal composite material as described in claim 1, wherein in Formula (I) $R^1$ is a tert-alkyl group, and n is 0.

6. The rubber-metal composite material as described in claim 1, wherein in Formula (I) $R^1$ is a tert-alkyl group, and $R^2$ is a linear alkyl group having 1 to 6 carbon atoms.

7. The rubber-metal composite material as described in claim 1, wherein in Formula (I) $R^1$ is a tert-alkyl group; n is 0; and $R^2$ is a linear alkyl group having 1 to 6 carbon atoms.

8. The rubber-metal composite material as described in claim 7, wherein in Formula (I) $R^1$ is a tert-alkyl group; n is 0; and $R^2$ is a methyl, ethyl or n-propyl group.

9. The rubber-metal composite material as described in claim 1, further wherein the rubber composition comprises cobalt and/or a compound containing cobalt.

10. The rubber-metal composite material as described in claim 9, wherein a content of cobalt and/or the compound containing cobalt is 0.03 to 3 parts by mass in terms of a cobalt amount based on 100 parts by mass of the rubber component.

11. The rubber-metal composite material as described in claim 9, wherein the compound containing cobalt is a cobalt salt of organic acid.

12. The rubber-metal composite material as described in claim 1, wherein the rubber component contains at least one of natural rubber and polyisoprene rubber.

13. The rubber-metal composite material as described in claim 1, wherein the rubber component comprises 50% by mass or more of natural rubber and the balance of a synthetic rubber.

14. The rubber-metal composite material as described in claim 1, wherein in Formula (I), $R^1$ is a branched alkyl group selected from the group consisting of isopropyl, isobutyl, sec-butyl, tert-butyl, isoamyl (isopentyl), neopentyl, tert-amyl (tert-pentyl), isohexyl, tert-hexyl, isoheptyl, tert-heptyl, isooctyl, tert-octyl, isononyl, tert-nonyl, isodecyl, tert-decyl, isoundecyl, tert-undecyl, isododecyl, and tert-dodecyl, and $R^2$ is a linear alkyl group selected from the group consisting of methyl, ethyl, n-propyl, n-butyl, n-amyl (n-pentyl), n-hexyl, n-heptyl, n-octyl, n-nonyl, and n-decyl.

* * * * *